Feb. 19, 1957

J. J. BRADY 2,781,581

CHART READING DEVICE

Filed Oct. 26, 1953

INVENTOR.
JAMES J. BRADY
BY Fulwider Mattingly & Babcock
Attorneys

Feb. 19, 1957　　　J. J. BRADY　　　2,781,581
CHART READING DEVICE
Filed Oct. 26, 1953　　　　　　　　　2 Sheets-Sheet 2
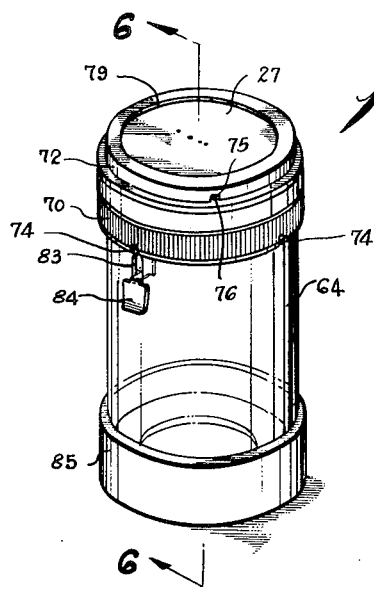
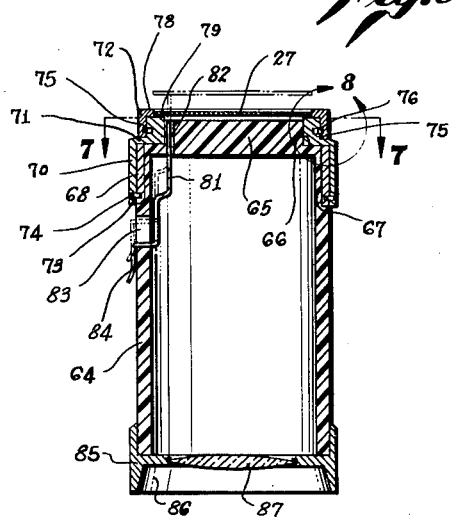
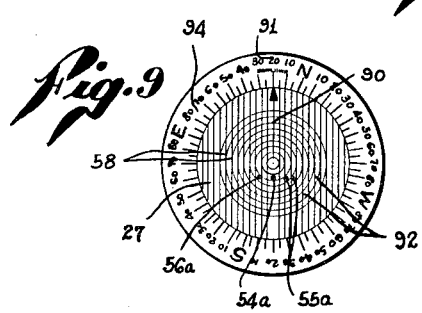
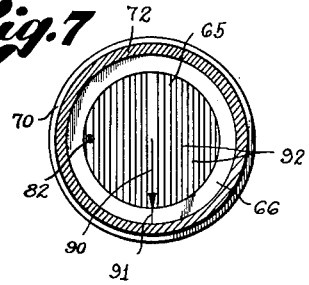
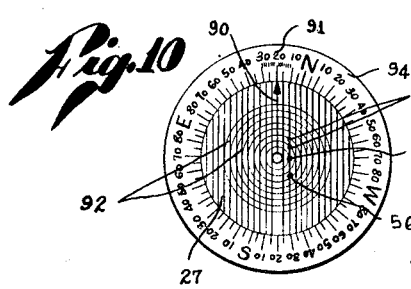
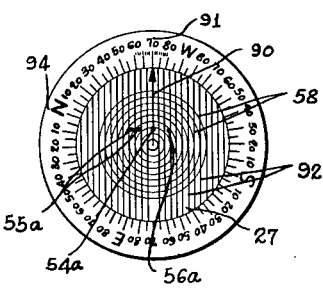
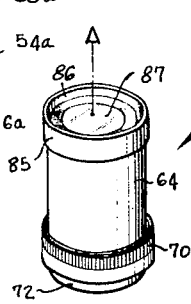
INVENTOR.
JAMES J. BRADY
BY
Attorneys though offset, in the direction of the magnetic north pole, as previously described.

United States Patent Office 2,781,581
Patented Feb. 19, 1957

2,781,581

CHART READING DEVICE

James J. Brady, North Hollywood, Calif., assignor to Technical Oil Tool Corporation, Ltd., Los Angeles, Calif., a corporation of California Application October 26, 1953, Serial No. 388,407

10 Claims. (Cl. 33—1)

This invention relates generally to well survey instruments, and more particularly to a reading device for measuring indicia marks on a chart which carries a record of the angle and direction of inclination of a well bore from the vertical.

An embodiment of the invention is especially adapted to read a chart recorded by the instrument disclosed in the co-pending application of Arthur R. Barnett, Oswald Suter, and Alfred J. Abs, Serial No. 205,091, filed January 9, 1951, for Directional Inclination Recording Apparatus, now Patent No. 2,770,887. This reading device is an improvement on the reading device disclosed in the aforesaid application providing for easier and more accurate operation while having the same general principles of measurement.

A major problem in connection with reading a chart of this type is to obtain accurate angular and linear measurements from a very small chart, the size of the chart being critically limited by the fact that the recording instrument must be susceptible of positioning within a well bore. In addition, the indicia marks upon the face of the cart are small points which must be carefully distinguished and aligned to determine the desired measurements.

With the foregoing in mind, it is a major object of this invention to provide a chart reading device providing for extreme accuracy of measurement of the position of indicia marks relative to the face of the chart.

An equally important object of the invention is to provide a chart reading device which is convenient to use and may be operated by unskilled persons.

Another object of the invention is to provide a chart reading device having a light transmitting chart holder to create points of light at pricked indicia marks on the chart for accurate discernment of the position thereof.

It is also an object of the invention to provide a chart reading device having a magnifying eyepiece focused on the plane of chart for more accurate reading of the chart.

A further object of the invention is to provide side light admitting means for illuminating the scale markings of the device to permit accurate reading thereof relative to the chart.

It is still another object of the invention to provide a chart holder for readily and firmly receiving a chart therein and ejection means for removing the chart therefrom.

A still further object of the invention is to provide a chart reading device which is compact and easily manufactured.

These and other objects and advantages will become apparent from the following detailed description of a preferred form thereof, and from an inspection of the accompanying drawings in which:

Figure 5 is a perspective view of a preferred form of chart reading device;

Figure 6 is a longitudinal medial section through the reading device;

Figure 7 is a cross section taken along the line 7—7 of Figure 6;

Figure 8 is an enlarged detail taken in the area 8 of Figure 6;

Figures 9, 10 and 11 are sectional views showing the appearance of the chart in the reading device and the steps in measuring the indicia group thereon; and Figure 12 is a perspective view of the reader taken in the direction of the eyepiece.

In order to understand fully the nature of the chart reading device, it is necessary to consider briefly the construction of the well bore instrument which marks the chart and the chart itself.

Figure 1:
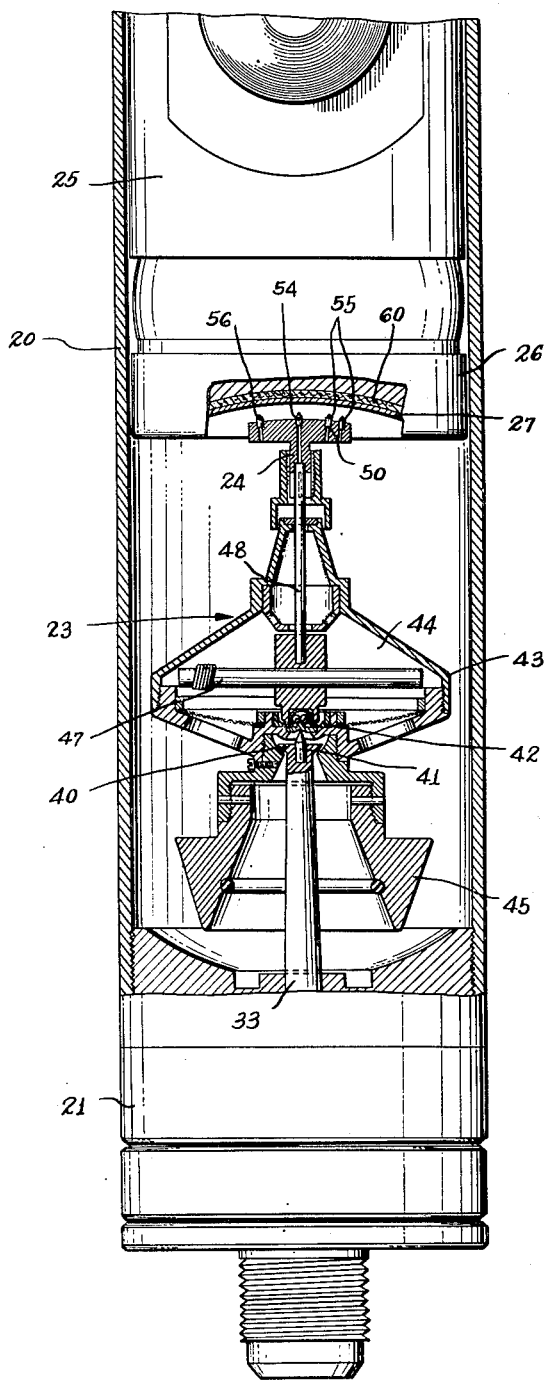
Figure 1 is a partial longitudinal section of a directional inclination recording instrument.
Figure 2:
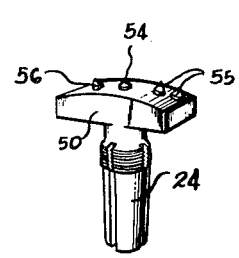
Figure 2 is a perspective detail of the indicating and marking head.

Referring now to the drawings, and particularly to Figures 1 and 2 thereof, the numeral 20 designates an elongated tubular housing which contains an instrument for recording the inclination and direction in azimuth of the deviation of a well bore from the vertical. Housing 20 is adapted to be contained within an outer shell which is positioned within a well bore in alignment with the axis of the bore and at any desired location therein. Housing 20 is closed at its lower end by a base member 21 and may be similarly closed at its upper end (not shown).

In the lower portion of housing 20 is an indicating assembly 23 containing compass and pendulum means mounted for relative rotational and pivotal movement as the housing is inclined in accordance with the direction of the well bore. The indicating assembly 23 has an upper indicating head 24 which is maintained in an upstanding vertical position and oriented in the direction of a north seeking compass means. The indicating head 24 is thus offset from the axis of housing 20 an amount which is proportional to the angular inclination of the well bore from the vertical, and is rotated in azimuth to the direction of the magnetic north pole. As will be explained in connection with the chart reading device, it is then possible to quickly measure the azimuthal direction of the well bore.

Suspended above indicating assembly 23 is a recording means or element 25 which controls the sliding movement of a chart holder 26 mounted on the lower end thereof. The chart holder 26 carries a circular chart 27 in coaxial alignment with the housing 20 and normally spaced above the indicating assembly 23. The recording element 25 releases chart holder 26 at predetermined time intervals, and the latter carries chart 27 into engagement with indicating head 24 and then returns to normal position. During each cycle of operation, a group of marks is made on the chart 27 which provides a record of the inclination and direction of azimuth of the well bore.

Indicating assembly 23 is supported from base 21 by central outstanding rod or stem 33 which carries an upper semispherical head or ball 40. On the top face of ball 40 is a projecting pivot pin 41 which pivotally supports assembly 23. The central bearing ring 42 overhangs pin 41 and is joined to an upper hollow shell 43 which defines an inner open chamber 44.

Surrounding stem 33 is a weighted depending skirt 45 which is joined to the upper housing 43. Skirt 45 pivots relative to stem 33 to maintain the indicating assembly 23 in an upstanding vertical position. The chamber 44 defines a space for rotatably mounting a magnetic compass element 47 having a shaft 48 extending upwardly and connected to indicating head 24. Head 24 is rotated by shaft 48, and is thus oriented in azimuth to the direction assumed by compass element 47. Indicating head 24 is formed with a transversely extending arm 50 which extends outwardly parallel to compass magnet 47. The upper surface of arm 50 is of convex curvature lying on an arc centered at the tip of pivot pin 41. The previously mentioned chart or record 27 is supported above arm 50 and has a similar radius of curvature formed therein by a concave seat in chart holder 26. On the surface of arm 50 are marking means which are adapted to engage and impress into the material of chart 27 a particular pattern or "indicia group" which records both the angular inclination of the well bore from the vertical and the orientation in azimuth of such inclination.

The marking means comprise a central pin 54 projecting upwardly from the surface of arm 50 and a pair of end or azimuth pins 55 and 56. The central pin 54 is in exact alignment with the longitudinal axis of the indicating assembly 23 and is therefore pivotally displaced or offset from the center of chart 27 an angular mark which is proportional to the relative inclination of the well bore from the vertical. The azimuth pins 55 and 56 are in alignment with the north and south ends, respectively, of the compass magnet 47 to record simultaneously with the inclination recording the relative orientation or direction of the magnetic north pole. In order that the north seeking end of compass magnet 47 may be distinguished from the opposite or south seeking end, two closely spaced marking pins 55 are placed at the corresponding end of arm 50. Thus, the indicia group recorded on chart 27 consists of a linear set of dots or impressions which indicate both inclination and direction in azimuth.

Figure 4:
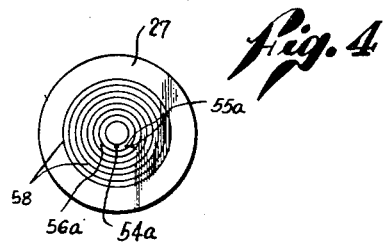
Figure 4 is a plan view of the chart showing a group of indicia marks thereon.

Chart 27 is formed as a circular disc of paper or other relatively soft material. On the face of chart 27 are painted or inscribed a set of concentric circles 58 as is best seen in Figure 4. Each circle or ring 58 is positioned so as to indicate degrees of inclination from the center of the chart, and hence degrees of inclination of the well bore from the vertical due to the nature of the recording instrument. Chart 27 is supported in chart holder 26 against a resilient and deformable locking pad 60 which is in turn seated in a concave seat formed in the holder.

Figure 3:
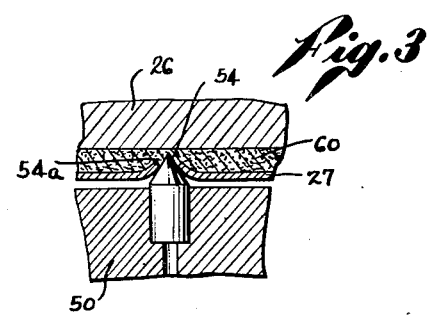
Figure 3 is an enlarged sectional detail showing the formation of perforated indicia marks on the chart.

When the chart holder 26 is moved downwardly towards indicating head 24, the marking pins 54—56 engage against chart 27. The purpose of pad 60 is to permit pins 54—56 to break the surface of chart 27 and extend therethrough thus forming small pin pricks or punch holes as is illustrated in Figure 3. The prick marks so produced are designated as 54a, 55a, and 56a, in accordance with the marking pins 54, 55, and 56, respectively, and form a linearly aligned indicia group as is shown in Figure 4. The chart 27 is of relatively opaque material and the pin pricks or marks 54a—56a are easily discernible when the chart is held up to the light.

The recording instrument as described herein may be constructed so as to be operated through multiple cycles of engagement and withdrawal of chart holder 26 from indicating head 24. Upon each cycle of engagement an indicia group will be formed on chart 27. If the instrument is not moved within the well bore, and chart holder 26 is not rotated, the indicia groups produced by successive operation should be superimposed on the chart 27. Thus, successive operations of the instrument serve to check the accuracy of the readings made upon the chart, for if the indicia groups are not superimposed it shows that the indicating assembly was not at rest, or that some other error has occurred, and the readings should be retaken.

After the chart 27 has been removed from the recording instrument it is necessary to measure the relative position of the marks 54a—56a thereon so as to determine the amount of inclination of the well bore from the vertical and the direction of this inclination in azimuth. While this could be done by the use of geometrical measuring instruments, it is much simpler and more accurate to use my improved chart reading device as will now be described.

A preferred form of chart reading device as best seen in Figures 5 and 6, is of elongated cylindrical shape and of a size to be held conveniently in the hand. A main tubular support or barrel 64 is formed of transparent material, preferably a durable plastic, and is closed at the top by a disc 65 formed integrally therewith and likewise transparent. Disc 65 is relatively thick and has an outer corner recess or groove 66 therein, the bottom of which forms a seat visible from the interior of barrel 64 through the remaining material of the disc. Below seat 66 an intermediate portion 67 of barrel 64 is of reduced wall thickness and is shouldered inwardly from the main exterior wall.

Rigidly secured to barrel 64 on the reduced wall portion 67 is a sleeve 68 which lies flush with the main wall of the barrel and extends upwardly to terminate at the level of seat 66. Sleeve 68 is formed of metal and provides a bearing surface for rotatably supporting an outer ring 70 which has an inwardly projecting flange 71 overhanging seat 66. The upper portion of ring 70 is shouldered inwardly above seat 66 to form a bearing for a second rotatable ring or chart holder 72 which extends slightly above the top of disc 65.

In order to secure ring 70 upon sleeve 68 a pair of opposed cooperating grooves 73 are formed in the adjacent wall surfaces thereof and fitted with interlocking spring clips 74 which prevent relative axial movement while allowing rotation thereof with a small amount of frictional resistance. A similar pair of cooperating grooves 75 are formed in the adjacent walls of ring 70 and ring 72 and fitted with spring clips 76.

Ring or chart holder 72 has a thin inwardly projecting flange 78 overlying the top of flange 71 and of approximately the same inner diameter. Flange 78 is recessed downwardly to form a seat 79 which lies just above the top face of disc 65 as is best seen in Figure 8. Seat 79 is slightly undersize to the periphery of the previously mentioned chart 27 and is adapted to hold the latter tightly therein when it is snapped into place. In this position the chart 27 is almost flush with the surface of disc 65 and light is directed against the back thereof through the opening in ring 72.

Because of the tight fit of chart 27 within seat 79 it is desirable to provide ejection means for removing the chart after the reading thereof has been completed. To this end I provide an ejector arm 81 which is slidable within barrel 64 and has an upper end portion extending through a longitudinal opening 82 in disc 65. The lower end of arm 81 is turned outwardly and passes through a slotted hole 83 in the side of barrel 64. Outside of barrel 64, arm 81 is formed with an enlarged thumb piece 84 which is adapted to be moved up and down to cause corresponding movement of arm 81. Normally, arm 81 is down, but as it is moved upwardly, it engages against chart 27 lifting it free of chart holder 72 as seen in phantom outline in Figure 6.

On the bottom end of barrel 64 is an annular flange ring 85 which is secured rigidly thereon and is shaped to form an outer eyecup 86. Mounted within ring 85 is a lens or eyepiece 87 of double convex curvature which serves as magnifying means. Preferably, lens 87 is cast of a suitable transparent plastic material for durability. The focal point of lens 87 is located at approximately the plane of the upper face of disc 65 so as to bring into magnified sharp focus both the top surface of the disc and the bottom face of chart 27. Lens 87 is also in sharp focus on the bottom of flange 71 which is visible through seat 66. Other more complex lens systems may, of course, be provided, but that described is preferred because of its simplicity.

Considering now the scale and measuring means provided on the reader, it will be seen in Figure 7 that the top face of disc 65 is provided with a radially extending index line 90 having an outer arrowhead in alignment with a segmental radial index line 91 formed on the surface of seat 66. Extending across the face of disc 65 parallel to index line 90 and in uniformly spaced relationship are a plurality of index lines 92 which extend completely across the disc. As can be appreciated, all of the index lines 90—92 are in magnified sharp focus when viewed through lens 87 as indicated in Figure 12.

On the bottom of flange 71 above seat 66, is an annular compass ring or scale 94 which can be observed through lens 87 as shown in Figures 9 through 11. Compass ring 94 has reversed degrees and compass points marked thereon to that of a conventional compass dial because the chart 27 is held inverted above the indicating head 24 when the indicia group is recorded in the instrument. Readings taken from the ring 94 therefore indicate the corresponding positions of indicating head 24 in normal azimuth as viewed from above. Segmental index line 91 extends across the face of dial 94 and can be read thereagainst.

After chart 27 has been marked, it is removed from the recording instrument and fitted into the holder ring 72 with the printed scale rings 58 facing towards the inside of the reader. The first step in reading chart 27 is to compensate for magnetic declination. This is done by setting the index line 91 to the magnetic declination for the area against scale 94 by movement of ring 70 relative to disc 65. In the illustration of Figure 9, the index line 91 is set for a magnetic declination of 20° east. As can be appreciated the purpose of compensating for the magnetic declination of the area is to correct the magnetic compass readings to readings of true azimuth. It should be particularly pointed out that the scale markings and the face of chart 27 are illuminated by side light which enters through the transparent barrel 64. If barrel 64 were not transparent, it would be very difficult to read the scale markings since the chart 27 is substantially opaque and passes very little light.

After correcting for magnetic declination, the next step is to orient chart 27 relative to compass scale 94. By holding the reader pointed towards a source of light the prick marks or holes comprising the indicia group 54a—56a become readily visible. Each mark becomes a point of light which is quite easily distinguished from the face of the chart. It will be remembered from the description of the recording instrument that indicating head 24 is aligned in the direction of magnetic north by the compass bar 47. Accordingly, the line or row of marks 54a—56a extends in a magnetic north-south line with the double marks 55a pointing in the north direction. Holding ring 70 stationary with respect to disc 65, the upper chart holding ring 72 is rotated to bring the row of marks 54a—56a parallel with the index line 90—91 as seen in Figure 10. Since the index lines 92 extend parallel to line 90—91, the marks 54a—56a are merely brought into parallelism with the closest index line. The close spacing of lines 92 permits the marks 54a—56a to be brought into very accurate parallel relationship thereto.

It should be noted that the marks 54a—56a as seen in Figure 10 do not extend through the center of chart 27 but lie off to one side thereof, in accordance with the inclination of the well bore. In bringing the line of marks 54a—56a into parallelism with the lines 90—92 the north end points 55a are pointed in the direction of the north pointing index line 90.

To establish the direction in which the well bore is inclined from the vertical, the ring 70 is rotated relative to disc 65 into the position shown in Figure 11. Ring 72 being in slight frictional engagement with ring 70 rotates therewith so that both compass ring 94 and chart 27 rotate together. In moving the chart 27 to the position shown in Figure 11, ring 70 is rotated until radial index line 90 bisects the mark 54a.

Recalling the nature of the recording instrument, it will be seen that mark 54a was produced by marking pin 54 which was at the center of indicating head 24 and is always maintained in the true vertical. Since the center of chart 27 corresponds to the longitudinal center of the recording instrument, mark 54a is offset from the center of chart 27 in an amount and in the direction of inclination of the well bore from the vertical. Accordingly, index line 90 as seen in Figure 11 points to the direction of inclination of the well bore from the vertical, which in the example illustrated gives a reading of N70° W. The amount of inclination of the well bore from the vertical is determined by measuring mark 54a relative to the inclination rings 58. In the example shown in Figure 11, if the rings 58 are spaced 1° apart, the inclination of the well bore is approximately 2½°.

While I have thus shown and described a preferred form of the reading device in considerable detail, it can be appreciated that the actual operation of the device is quite simple. Furthermore, modification of design and construction of the reading device can be made without departing from the spirit of the invention, and I do not wish to be restricted to the foregoing except as defined in the appended claims.

I claim:

1. A reading device for a chart having a plurality of pricked marks therethrough aligned in a known azimuthal direction, with one of said marks being radially offset from the center of the chart a distance proportional to the angular inclination of a well bore from the vertical and in the direction of the inclination of said well bore, which comprises: a chart holder having a light transmitting opening extending therethrough from front to back and a seat adapted to support the edges of a chart to extend across said opening whereby points of light are transmitted through said indicia marks; a compass ring concentrically mounted on the front of said holder for rotation relative to said holder; and a transparent index disc mounted for rotation relative to said holder and said ring and positioned concentric with said ring and in front of a chart supported in said holder, said disc having a radial index line positionable in said known direction relative to said ring by a first rotation of said disc, and said light points being aligned in said known direction by rotation of said holder relative to said disc to bring said points in parallelism with the index line, said disc then being rotated relative to said chart and said compass ring to bring said index line through the point which is radially offset from the center of the chart to determine the direction of angular inclination.

2. A reading device for a chart having a plurality of pricked marks therethrough aligned in a known azimuthal direction, with one of said marks being radially offset from the center of the chart a distance proportional to the angular inclination of a well bore from the vertical and in the direction of the inclination of said well bore, which comprises: a chart holder having a light transmitting opening extending therethrough from front to back and a seat adapted to support the edges of a chart to extend across said opening whereby points of light are transmitted through said indicia marks; a compass ring mounted concentrically on the front of said holder for rotation relative to said holder; a transparent index disc mounted for rotation relative to said holder and said ring and positioned concentrically adjacent with said ring and in front of a chart supported in said holder, said disc having a radial index line and a plurality of spaced parallel index lines, said radial index line being positioned in said known direction relative to said ring by a first rotation of said disc, and said light points being aligned in said known direction by rotation of said holder relative to said disc to bring said points in parallelism with the adjacent index line, said disc then being rotated relative to said chart and said compass ring to bring said radial index line through the point which is radially offset from the center of the chart to determine the direction thereof; and a magnifying eyepiece spaced outwardly from said disc and focused on the plane of said chart to facilitate alignment of said light points and said index line, and reading of said compass ring.

3. A reading device for a chart having a plurality of pricked marks therethrough aligned in a known azimuthal direction, with one of said marks being radially offset from the center of the chart a distance proportional to the angular inclination of a well bore from the vertical and in the direction of the inclination of said well bore, which comprises: an annular chart holder having a light transmitting opening extending therethrough from the front to back and a seat adapted to support the edges of a circular chart to extend across said opening whereby points of light are transmitted through said pricked indicia marks; a ring concentrically mounted on the front of said holder, for rotation relative to said holder and having a compass scale thereon; a support extending coaxially outwardly from said holder beyond said ring and being light admitting for illuminating said compass scale with side light, said support being rotatable relative to said holder and said ring; a transparent index disc mounted on said support and positioned concentrically adjacent said ring and in front of a chart supported in said holder, said disc having a radial index line and a plurality of spaced parallel index lines, said radial index line being positioned in said known direction relatve to said ring by a first rotation of said disc, and said light points being aligned in said known direction relative to said ring by a first rotato said disc to bring said points in parallelism with the adjacent index line, said disc then being rotated relative to said chart and said compass ring to bring said radial index line through the point which is radially offset from the center of the chart to determine the direction thereof; and a magnifying eyepiece mounted on the outer end of said support and focused on the plane of said chart to facilitate accurate alignment of said light points and said index line, and reading of said scale.

4. A reading device for a chart having a plurality of pricked marks therethrough aligned in a known azimuthal direction, with one of said marks being radially offset from the center of the chart a distance proportional to the angular inclination of a well bore from the vertical and in the direction of the inclination of said well bore, which comprises: an annular chart holder having a light transmitting opening extending therethrough from front to back and a seat adapted to support the edges of a circular chart to extend across said opening whereby points of light are transmitted through said pricked indicia marks; a ring concentrically mounted on the front of said holder for rotation relative to said holder and having a compass scale thereon; a tubular transparent support extending coaxially outwardly from said holder beyond said ring and rotatable relative to said holder and said ring, said support admitting side light for illuminating said compass scale; a transparent index disc mounted on said support and positioned concentrically adjacent said ring and in front of a chart supported in said holder, said disc having a radial index line and a plurality of spaced parallel index lines, said radial index line being positioned in said known direction relative to said ring by a first rotation of said disc, and said light points being aligned in said known direction by rotation of said holder relative to said disc to bring said points in parallelism with the adjacent index line, said disc then being rotated relative to said chart and said compass ring to bring said radial index line through the point which is radially offset from the center of the chart to determine the direction thereof; and a magnifying eyepiece mounted on the outer end of said support and focused on the plane of said chart to facilitate accurate alignment of said light points and said index line, and reading of said scale.

5. A chart reading device for use with a chart having an indicia mark of different light transmitting density than the face of said chart which comprises: a chart holder having a light transmitting opening extending therethrough from front to back, said holder being adapted to support a chart to extend across said opening with the front of said chart facing the front of said holder; an opaque scale mounted on the front of said holder and surrounding said chart in approximately the same plane as said chart; and transparent index means mounted on said holder directly in front of said chart and movable relative thereto, said index means having an opaque index line thereon adapted to be disposed parallel to said indicia mark and readable against said scale.

6. A chart reading device for use with a chart having an indicia mark of different light transmitting density than the face of said chart which comprises: a chart holder having a light transmitting opening extending therethrough from front to back, said holder being adapted to support a chart to extend across said opening with the front of said chart facing the front of said holder; an opaque scale mounted on the front of said holder and surrounding said chart in approximately the same plane as said chart; a support extending coaxially outwardly from the front of said holder and being light admitting for the illumination of said scale; transparent index means mounted on said holder directly in front of said chart and movable relative thereto, said index means having an opaque index line thereon adapted to be disposed parallel to said indicia mark and readable against said scale; and a magnifying eyepiece mounted on said support and focused on the plane of said chart to facilitate alignment of said indicia mark and said index line, and the reading of said scale.

7. A chart reading device for use with a chart having an indicia mark of different light transmitting density than the face of said chart which comprises: a chart holder having a light transmitting opening extending therethrough from front to back, said holder being adapted to support a chart to extend across said opening with the front of said chart facing the front of said holder; an opaque compass ring mounted rotatably and concentrically on the front of said holder and having scale marks thereon facing forwardly of said holder and surrounding said chart; and transparent index means mounted on said holder directly in front of said chart and movable relative thereto, said index means having an opaque index line thereon adapted to be disposed parallel to said indicia mark and readable against said scale marks.

8. A chart reading device for use with a chart having an indicia mark of different light transmitting density than the face of said chart which comprises: a chart holder having a light transmitting opening extending therethrough from front to back, said holder adapted to support a chart to extend across said opening with the front of said chart facing the front of said holder; an opaque compass ring mounted rotatably and concentrically on the front of said holder and having scale marks thereon facing forwardly of said holder and surrounding said chart; a support extending coaxially outwardly from the front of said holder and being light admitting for the illumination of said scale; transparent index means mounted on said holder directly in front of said chart and movable relative thereto, said index means having an opaque index line thereon adapted to be disposed parallel to said indicia mark and readable against said scale marks; and a magnifying eyepiece mounted on said support and focused on the plane of said chart to facilitate alignment of said indicia mark and said index line, and the reading of said scale marks.

9. A chart reading device for use with a chart having a pricked indicia mark therethrough which comprises: a chart holder having a light transmitting opening extending therethrough from front to back, said holder being adapted to support the edges of a chart to extend across said opening with the front of said chart facing the front of said holder whereby a point of light is transmitted through said indicia mark from a light source behind said holder; an opaque compass ring mounted rotatably and concentrically on the front of said holder and having scale marks thereon facing forwardly of said holder and surrounding said chart; and a transparent index disc mounted concentrically and rotatably on said holder directly in front said chart, said disc having an opaque index line thereon alignable with said light point and readable against the scale marks of said ring.

10. A chart reading device for use with a chart having a pricked indicia mark therethrough which comprises: a chart holder having a light transmitting opening extending therethrough from front to back, said holder being adapted to support the edges of a chart to extend across said opening with the front of said chart facing the front of said holder whereby a point of light is transmitted through said indicia mark from a light source behind said holder; an opaque compass ring mounted rotatably and concentrically on the front of said holder and having scale marks thereon facing forwardly of said holder and surrounding said chart; a support extending coaxially outwardly from the front of said holder and being light admitting for the illumination of said scale marks; a transparent index disc mounted concentrically and rotatably on said holder directly in front of said chart, said disc having an opaque index line thereon alignable with said light point and readable against the scale marks of said ring; and a magnifying eyepiece mounted on said support and focused on the plane of said chart to facilitate alignment of said indicia mark and said index line, and the reading of said scale marks.

References Cited in the file of this patent
UNITED STATES PATENTS

| | | |
|---|---|---|
| 1,518,419 | Styll | Dec. 9, 1924 |
| 2,013,603 | Dalton | Sept. 3, 1935 |
| 2,129,395 | Anderson | Sept. 6, 1938 |
| 2,314,838 | Kingston | Mar. 23, 1943 |
| 2,395,574 | Miller | Feb. 26, 1946 |
| 2,496,099 | Leto | Jan. 31, 1950 |